No. 607,575. Patented July 19, 1898.
T. L. & T. J. STURTEVANT.
CRUSHING MACHINE.
(Application filed Oct. 4, 1897.)
(No Model.) 5 Sheets—Sheet 1.
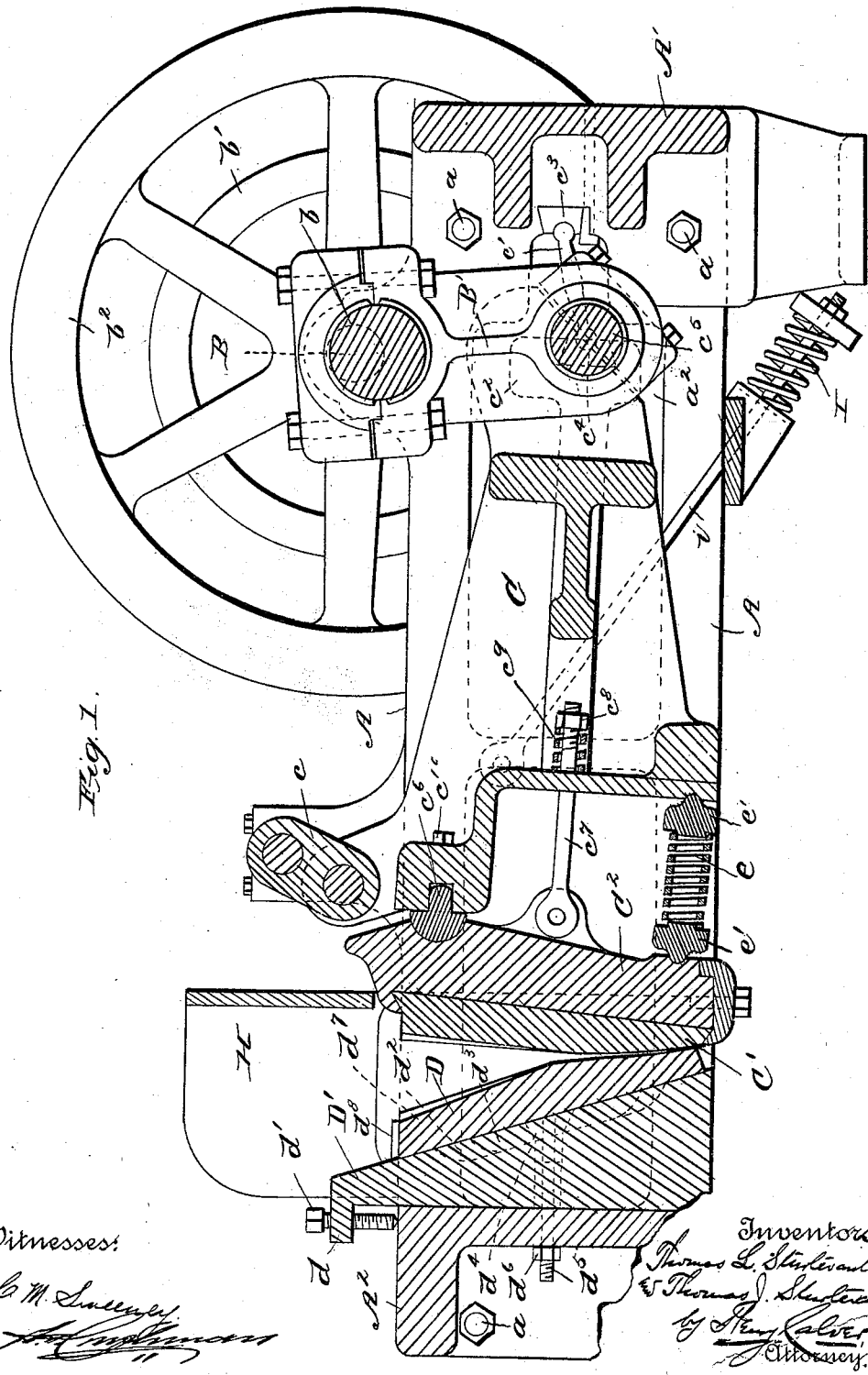

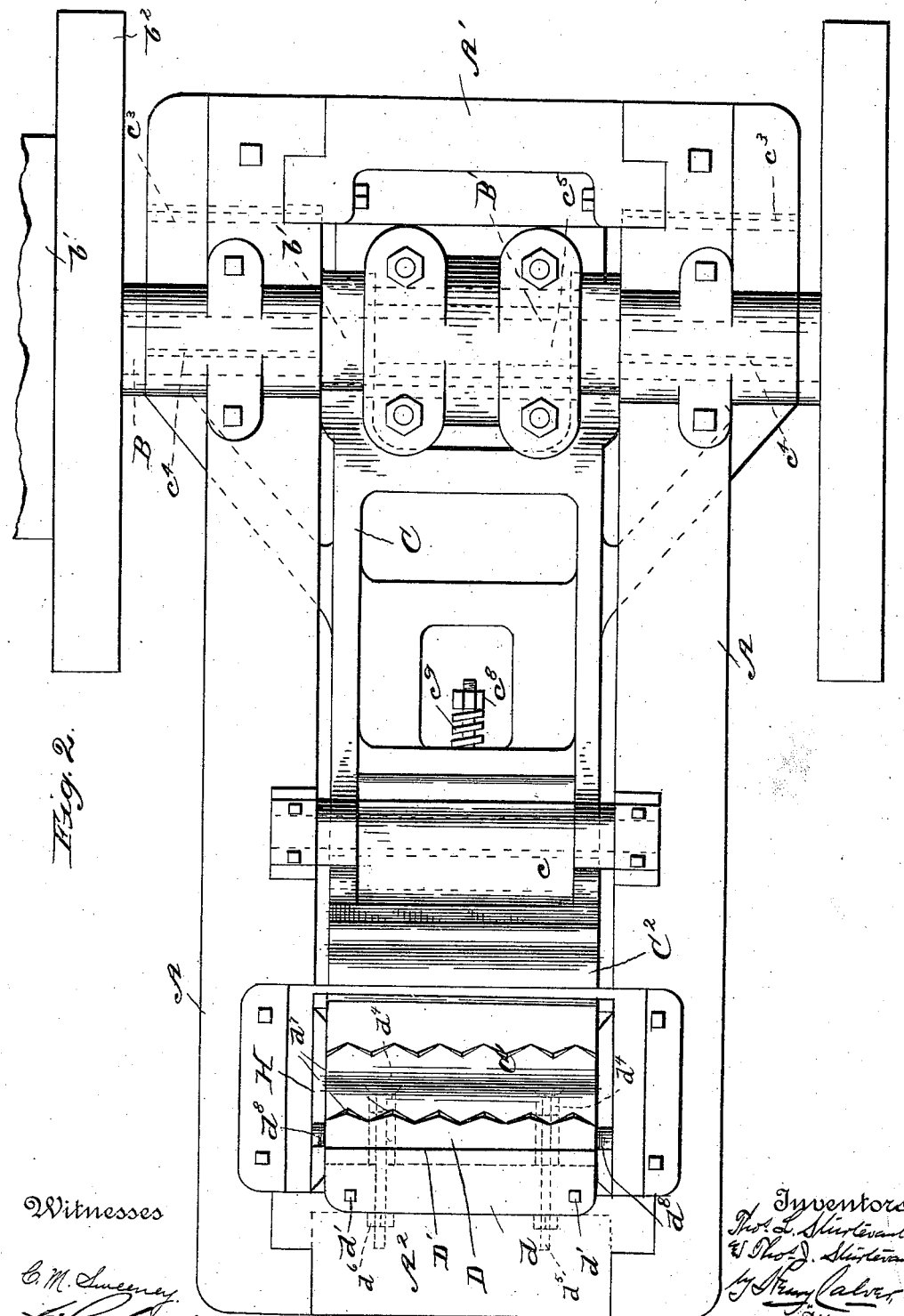

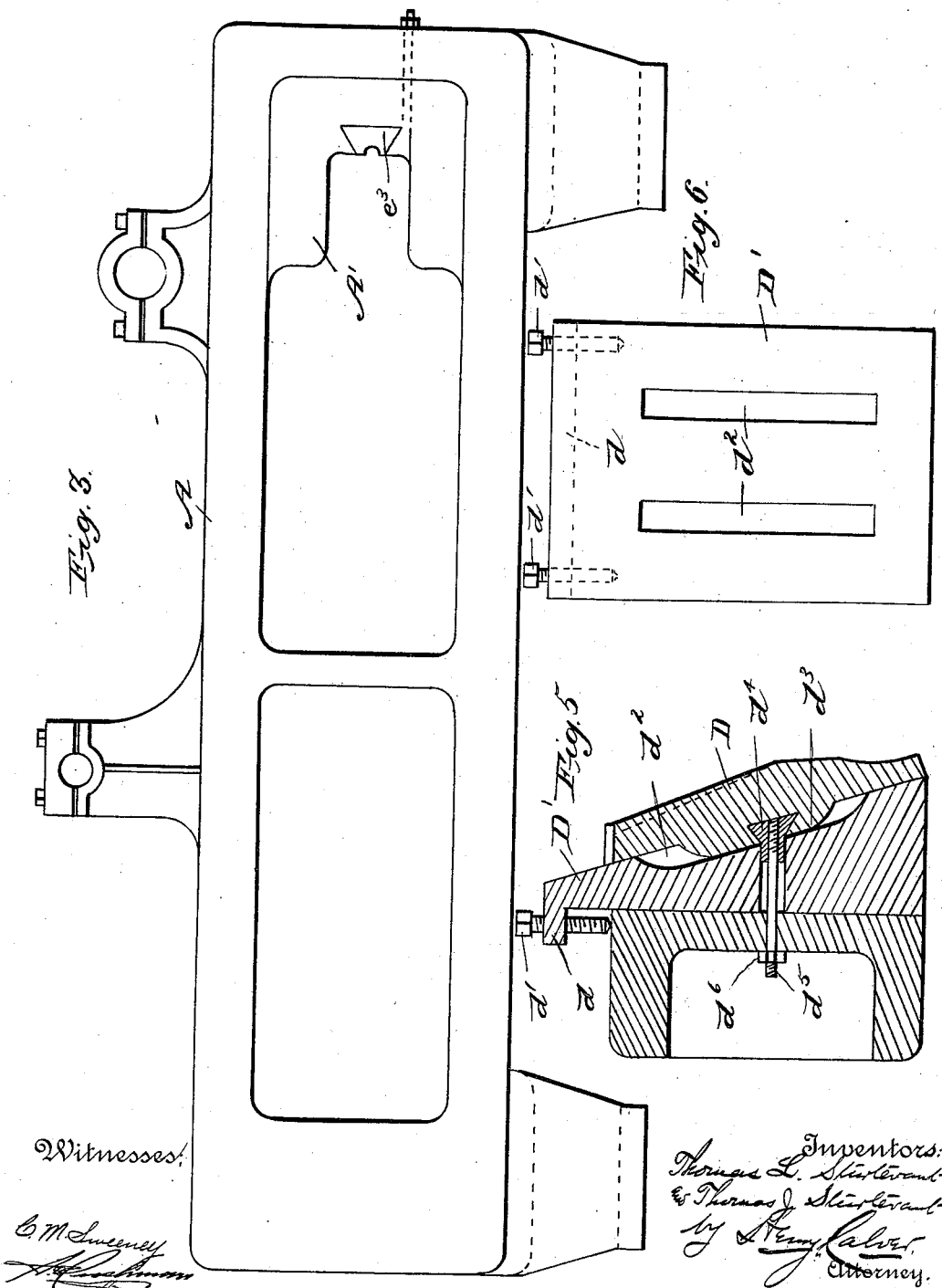

No. 607,575. Patented July 19, 1898.
T. L. & T. J. STURTEVANT.
CRUSHING MACHINE.
(Application filed Oct. 4, 1897.)
(No Model.) 5 Sheets—Sheet 4.
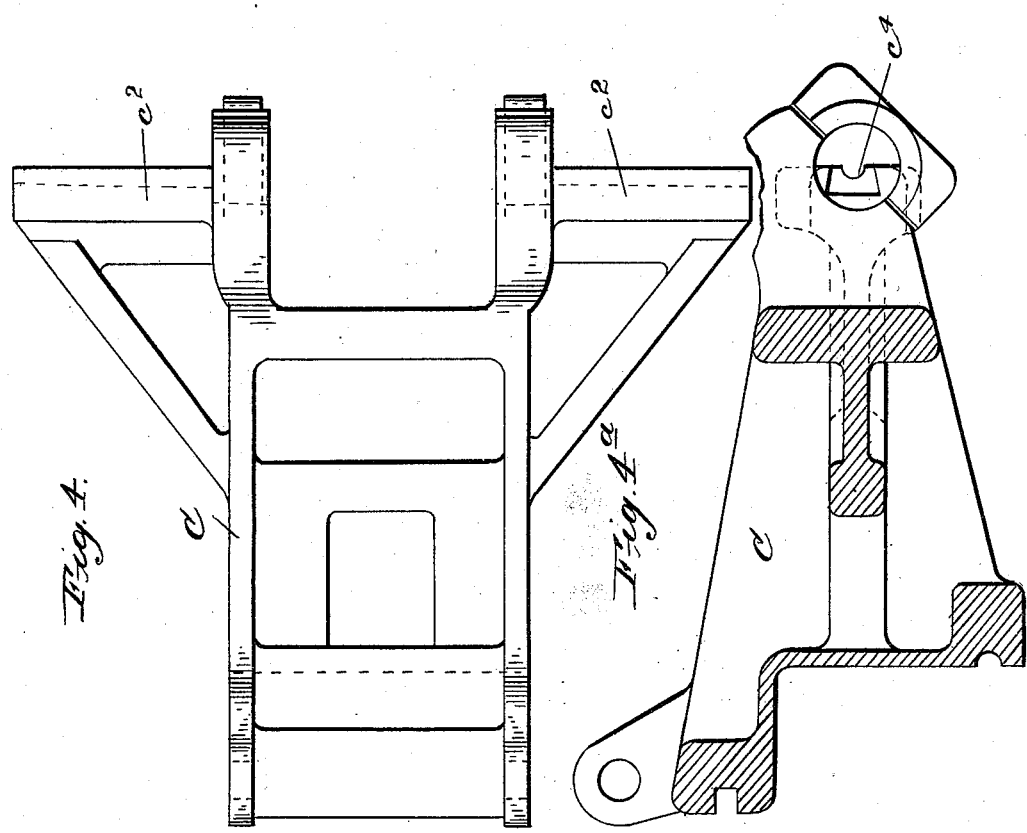

No. 607,575.　　　　　　　　　　　　　　　　　　Patented July 19, 1898.
T. L. & T. J. STURTEVANT.
CRUSHING MACHINE.
(Application filed Oct. 4, 1897.)

(No Model.)　　　　　　　　　　　　　　　　　　5 Sheets—Sheet 5.

Witnesses:
C. M. Sweeney

Inventors:
Thomas L. Sturtevant
Thomas J. Sturtevant
by Henry Calver,
Attorney.

UNITED STATES PATENT OFFICE.

THOMAS L. STURTEVANT, OF QUINCY, AND THOMAS J. STURTEVANT, OF FRAMINGHAM, MASSACHUSETTS.

CRUSHING-MACHINE.

SPECIFICATION forming part of Letters Patent No. 607,575, dated July 19, 1898.

Application filed October 4, 1897. Serial No. 654,008. (No model.)

*To all whom it may concern:*

Be it known that we, THOMAS L. STURTEVANT, residing at Quincy, in the county of Norfolk, and THOMAS J. STURTEVANT, residing at Framingham, in the county of Middlesex, State of Massachusetts, citizens of the United States, have invented certain new and useful Improvements in Crushing-Machines, of which the following is a specification, reference being had therein to the accompanying drawings.

Our invention relates to that class of crushing-machines for reducing ores, stones, and other hard substances and in which the coarse material fed between the crushing-jaws may be reduced to any desired degree of fineness.

This invention is an improvement upon the machine covered by our Patent No. 588,618, dated August 24, 1897, the object of the present invention being to improve the general structure of the machine as well as to provide means for preventing injury to the machine when any unusually hard substance accidentally gets between the crushing-jaws thereof.

Figure 7:
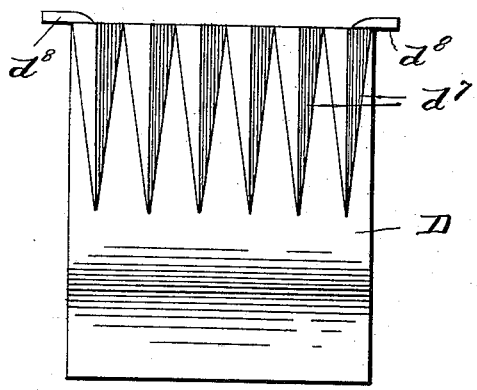
Figure 8:
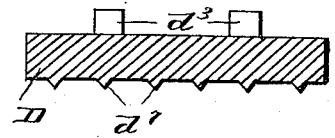
Figure 9:
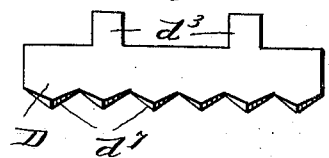
Figure 10:
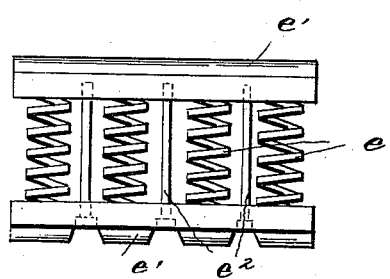
Figure 11:
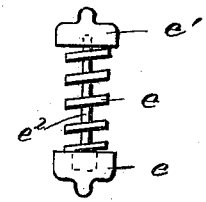
Figure 12:
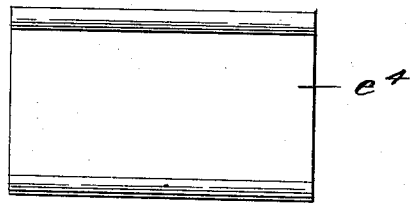
Figure 13:
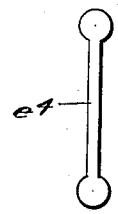

In the accompanying drawings, Figure 1 is a sectional side view of our improved machine. Fig. 2 is a plan view thereof. Fig. 3 is a side view of the frame of the machine; Fig. 4, a detail plan view of the active or movable crushing-jaw, and Fig. 4$^a$ is a sectional view of the same. Fig. 5 is a sectional view to show the stationary jaw and its means for adjustment, and Fig. 6 is a face view of the wedge for adjusting said jaw. Figs. 7, 8, and 9 are face, sectional, and top views, respectively, of the stationary jaw, Fig. 8 being a section on line 8 8 of Fig. 7. Figs. 10 and 11 are detail views showing the springs for cushioning the face portion of the movable jaw and the case or frame in which said springs are held, and Figs. 12 and 13 are detail views of a breaking-piece which may be substituted for the said springs and their holding-frame.

The frame of the machine consists, preferably, of the heavy cast-metal side pieces A and end blocks A' A', mortised into the said side pieces and removably secured thereto by bolts $a$, so that either one of the said end blocks or side pieces, preferably the back end block A', may be left out until the machine is partly assembled or may be removed at any time when it may be necessary or desirable to get at the mechanism of the machine, as in making repairs or replacing the parts. This construction of the divided frame is particularly desirable in heavy machines of this kind, as a massive movable jaw or jaw-frame cannot easily be put into or removed from a solid machine-frame in assembling the machine or in taking it apart.

B is the driving-shaft, mounted in the frame of the machine and provided with an operating crank or eccentric $b$ and with a suitable pulley and fly-wheel $b'$ $b^2$.

C is the frame of the movable or active jaw of the crusher, the front end portion of said frame being supported by a guide-link $c$ and the rear end portion thereof being joined by the pitman B' with the eccentric $b$ on the driving-shaft B. The guide-link $c$, jointed to the upper or top portion of said jaw-frame C and to the machine-frame, operates better and is more convenient of access than the guide link or links of our former machine. The said movable jaw-frame is braced against the back end block A' of the machine-frame by toggle-links $c'$, the rounded ends of which are seated in suitable sockets in blocks $c^3$, supported in the said end block A', and similar blocks $c^4$, seated in the jaw or jaw-frame C. The toggle-link socket-blocks $c^4$ are seated in wings or trunnions $c^2$, formed on and projecting laterally from the jaw-frame C, said wings or trunnions and said toggle-links being housed in recesses $a^2$, formed for their reception in the side pieces A of the machine-frame. This construction is a very important matter, since it allows of ample bearing length for the lower attachment of the connecting-rod without unduly widening the frame and also permits ample surfaces for the toggle-bearings, which can also be protected in these frame-recesses from dust.

The pivotal centers of the front ends of the toggle-links $c'$, or the ends thereof joining the rear end of the jaw-frame C, are in line, transversely of the machine, with the center of the pin $c^5$, at which point the said frame is jointed to the pitman or connecting-rod B', so that the latter will have no tendency to lift the jaw or the toggle-links, these parts being intended merely to rock or oscillate, so that the lower convex portion of the movable jaw-plate C' will merely have a rolling action against or adjacent to the concave lower portion of the stationary jaw-plate D. The pivotal center of the front ends of the said toggle-links and the center of the pitman-pin is the center of a circle of which the convex lower part of the face of the plate C' of the active or moving jaw is an arc.

The movable face-plate or jaw-plate C' is attached to a backing-plate $C^2$, the upper end of which is jointed by the axis-block $c^6$ to the jaw-frame C and the lower end of which is yieldingly supported relative to said frame by heavy spiral springs $e$, held in a case or frame consisting of bars $e'$, socketed into the said jaw-frame and backing-plate by means of convex ribs with which said bars are provided and which enter concave sockets or seats (see Fig. 1) in said backing-plate and jaw-frame, said bars being connected by bolts $e^2$, by means of which the said springs are compressed so that they will oppose any desired resistance without yielding, or, in other words, so that their initial tension may be regulated as may be desired. This socketed construction of the bars $e'$ permits the jaw-plate to yield or move backward without cramping the springs. The said backing-plate $C^2$ is also connected with the said jaw-frame C by a rod $c^7$, jointed to said backing-plate. Between a nut $c^8$ on said rod and a portion of the said jaw-frame is interposed a spring $c^9$, which may be compressed to any desired degree by screwing up said nut and which serves as a stop to limit the outward movement of said pivoted backing-plate under the influence of the said springs $e$. The axis-block $c^6$ is secured to the jaw-frame C by a bolt or bolts $c^{10}$.

The stationary jaw-plate D is adjustable toward and from the movable jaw-plate C' by means of a vertically-movable wedge D' interposed between said plate and the front end block $A^2$ of the machine-frame, said wedge being provided at its top with a flange $d$, through which adjusting-screws $d'$ are tapped to impinge against the top of said end block, so that by turning said screws the said wedge may be adjusted up or down when desired. The said wedge is preferably provided with grooves $d^2$, which are entered by ribs $d^3$ on the plate D, said ribs being connected by socket-blocks $d^4$ and bolts $d^5$ with the end block $A^2$ and the said bolts being provided with nuts $d^6$, which are loosened when the wedge D' is to be adjusted up or down and which are tightened to hold the said jaw-plate D and wedge D' securely in place. The upper portion of the face of the stationary jaw-plate D is provided with vertical tapering ribs $d^7$, and the upper portion of the movable jaw-plate is of similar construction, the said upper portions of said plates diverging from each other to form a receptacle into which the coarse material from the hopper H can fall. This ribbed or corrugated construction of the upper portions of said jaw-plates enables the latter to get a better hold upon the rough material to be crushed than they otherwise would. The stationary jaw-plate is prevented from dropping, when the nuts $d^6$ are loosened, by laterally-projecting lugs $d^8$, with which said plate is provided and which rest on the tops of the side pieces A of the machine-frame beneath the hopper H, so that the said hopper, when bolted down, will prevent said jaw-plate from rising, thus assisting the bolts $d^5$ to hold it in place.

The movable jaw is so mounted that the convex lower portion of the jaw-plate C' has simply a rolling or rocking movement against or adjacent to the concave lower portion of a stationary or bed jaw, this rolling action of the movable jaw relative to the said fixed jaw being fully described in our Patent No. 588,618, hereinbefore referred to. It will therefore be understood that in operation our movable jaw is not bodily advanced and retracted relative to the said fixed or bed jaw, but performs its crushing and pulverizing action simply by its rocking, rolling, or oscillating movements. In other words, the active jaw does not in operation move bodily toward and from the fixed jaw, but has simply a rolling movement relative thereto, so that it operates similarly to a crushing-roller against a flat fixed bed.

To prevent the movable jaw from pounding, we preferably provide one or more check-springs I, connected by bolts $i$ with the jaw-frame C, similarly as in the machine shown by our patent referred to.

The cushioning-springs $e$ are of sufficient strength, so that under ordinary conditions they will not yield, and the movable jaw therefore normally performs its crushing action relative to the fixed or bed jaw as though it were rigid with the jaw-frame. If, however, an extraordinary resistance occurs, as where a sledge-hammer or drill is accidentally dropped into the material to be crushed, the said springs will yield and thus prevent either of the jaws or other parts of the machine from being broken.

Instead of the springs $e$, by which the backing-block $C^2$ is elastically supported on the jaw-frame C, we may substitute breaking-pieces $e^4$, which would preferably be socketed into the said backing-plate and jaw-frame and which when an extraordinary resistance occurs would be crushed, and the breaking or injury of the other parts of the machine be thereby avoided.

The guide-link $c$, from which the forward end of the movable jaw or jaw-frame is suspended, is a rigid bar or block and which, while jointed at its ends the machine-frame and jaw-frame, does not of itself yield, but serves to positively guide the said jaw or jaw-frame, so that the latter can have merely its rocking or rolling action, and any rubbing of the movable jaw against the fixed jaw is avoided. Such rubbing action would be objectionable, as it would result in undue wear of the jaws.

We are aware that it is not new, broadly, to cushion crushing-jaws by providing elastic backings therefor to avoid injury to the machines when extraordinary resistances are presented. We have discovered, however, that by providing the rocking jaw-frame or moving jaw part with a face plate or portion which is movable relatively to the jaw-frame and behind which is placed a backing for opposing a certain predetermined resistance, but which is adapted to give way under excessive pressure, certain advantageous results are secured. Thus in a crushing and pulverizing machine of the type herein shown and in which the yielding jaw-plate is placed on the rocking jaw-frame a much better clearance for the finely-crushed material is afforded than would be the case if the yielding plate were placed upon the stationary jaw. This is due to the fact that although the yielding or elastic jaw-plate is supposed to move normally with the rocking jaw there is nevertheless a slight movement of the elastic plate relative to the rocking jaw-frame, which assists in the discharge of finely-crushed material, so that the machine is very much less likely to clog than with the old construction, and we can therefore crush materials that with the old construction would soon bank up and obstruct the delivery of the finely-crushed material. There is, furthermore, an important advantage in placing the pivoted spring jaw-plate upon the movable jaw in that it is much cheaper to drill, plane, and machine the parts of the machine than it would be to do the same work upon the heavy frame parts, as is required if the spring or springs be put behind the stationary jaw. We do not therefore wish to be understood as limiting our invention to the details of construction which we have shown and described, as such details may be varied widely without departing from the spirit of our invention.

Having thus described our invention, we claim and desire to secure by Letters Patent—

1. In a crushing-machine, the combination with a fixed jaw, of a movable jaw-frame having a face plate or portion movably mounted thereon, and means, placed behind said face plate or portion, for opposing a certain predetermined resistance, but adapted to yield or give way under excessive pressure, to avoid injury to the machine.

2. In a crushing-machine, the combination with a fixed jaw, of a movable jaw-frame having a face-plate which is pivoted at its upper part to said movable jaw-frame and provided with a convex lower face portion, and means, placed behind the lower part of said face-plate, for opposing a predetermined resistance, but which will yield when such resistance is overcome, to avoid injury to the machine.

3. In a crushing-machine, the combination with a fixed jaw, of a movable jaw-frame having a face-plate which is provided with a convex lower face portion and which is pivoted at its upper part to said movable jaw-frame, said face-plate being yieldingly supported at its lower part by cushioning-springs which will oppose a certain predetermined resistance, but which will yield when such resistance is overcome and thereby avoid injury to the machine.

4. In a crushing-machine, the combination with a fixed jaw, of a movable jaw-frame pivoted at its upper part to said movable jaw-frame and having a convex lower face portion, a spring or springs placed behind the lower part of said pivoted face-plate to permit the latter to yield under excessive pressure, and a yielding stop which limits the outward movement of the said face-plate under the influence of said spring or springs.

5. In a crushing-machine, the combination with a fixed jaw, of a movable jaw-frame provided with a face-plate pivoted at its upper part to said movable jaw-frame, and having a convex lower face portion, springs placed behind the lower part of said pivoted face-plate, and a case or frame in which said springs are held and which consists of bars connected by bolts and by which bolts the initial tension of said springs may be regulated.

6. In a crushing-machine, the combination with a fixed jaw, of a movable jaw-frame provided with a face-plate pivoted at its upper part to said movable jaw-frame, springs placed behind the lower part of said pivoted plate, and a case or frame in which said springs are held and which case or frame comprises bars connected by bolts by which the initial tension of said springs may be regulated, said bars being provided with convex ribs or portions and the said movable jaw-frame and pivoted face-plate being provided with concave seats for the reception of said convex ribs; whereby cramping of said springs is avoided when the pivoted face-plate yields.

7. In a crushing-machine, the combination with a fixed jaw, of a movable jaw-frame having a face plate or portion pivoted near its top and having a convex lower face portion, a spring or springs interposed between the lower part of said face-plate and said jaw-frame, and a holdback-bolt connecting the said pivoted face-plate to the said jaw-frame.

8. In a crushing-machine, the combination with a fixed jaw, of a movable jaw or jaw-frame C, the jaw-plate C', the backing-plate $C^2$ supporting said jaw-plate, the axis-block $c^6$ by which said backing-plate is pivotally supported on the said jaw-frame near its top, springs interposed between the lower part of said backing-plate and said jaw-frame, and a bolt connecting the central part of said backing-plate with said jaw-frame and provided with a nut between which and a portion of the said jaw-frame is interposed a coil-spring the tension of which may be regulated by said nut.

9. In a crushing-machine, the combination with a fixed jaw, of a movable jaw-frame or carrier mounted to have a rocking movement relative to said fixed jaw, and having a jaw plate or face which is cushioned or elastically mounted so as to yield to excessive pressure.

10. In a crushing-machine, the combination with a stationary jaw, of a movable jaw-frame or carrier mounted to have a rocking movement relative to said fixed jaw and having a pivoted jaw-plate, a spring or springs placed behind the said pivoted jaw-plate, and a holdback-bolt for limiting the outward movements of said pivoted jaw-plate under the influence of said spring or springs.

11. In a crushing-machine, a movable jaw or jaw-frame having laterally-projecting wings or trunnion portions, as $c^2$, and a pitman-pin between the same, of toggle-links connected with said wings or trunnion portions, a driving-shaft provided with a rotating crank or eccentric and a pitman connecting the said crank or eccentric with said pitman-pin.

12. In a crushing-machine, a movable jaw or jaw-frame having laterally-projecting wings or trunnion portions, as $c^2$, and a pitman-pin between the same, of toggle-links connected with said wings or trunnion portions, stationary abutments for said toggle-links, a driving-shaft provided with a rotating crank or eccentric and a pitman connecting the said crank or eccentric with said pin, the pivotal centers of said toggle-links and the center of said pin being in line with each other transversely of the machine.

13. In a crushing-machine, a movable jaw or jaw-frame having laterally-projecting wings or trunnion portions, as $c^2$, and a pitman-pin between the same, of toggle-links connected with said wings or trunnion portions, stationary abutments for said toggle-links, a driving-shaft provided with a rotating crank or eccentric and a pitman connecting the said crank or eccentric with said pitman-pin, the pivotal centers of said toggle-links and the center of said pin being in line with each other transversely of the machine, said movable jaw having a convex active face portion which is in the arc of a circle described from a center coincident with the said pivotal centers of said links and the said center of said pitman-pin.

14. In a crushing-machine, the combination with a movable jaw or jaw-frame provided with laterally-projecting wings or trunnion portions, as $c^2$, of the machine-frame provided with openings in which said wings or trunnion portions are housed, and toggle-links also housed in said openings.

15. In a crushing-machine, the combination with the driving-shaft thereof provided with a crank or eccentric, of a stationary jaw, a movable jaw-frame provided with a face or acting portion the lower part of which is convex, an operating-pitman directly connecting the rear part of said jaw-frame with the said crank or eccentric, a rigid guide-link jointed to the said jaw-frame and to the machine-frame and serving to pivotally support the forward end of said jaw-frame on said machine-frame, a stationary abutment, and a toggle link or links interposed between said abutment and the rear part of said jaw-frame.

16. The combination with the stationary jaw-plate D provided at its top with the laterally-projecting lugs $d^8$ resting on the top of the machine-frame, of a bolt or bolts and a nut or nuts on said bolt or bolts for securing said jaw-plate in place, said lugs serving to support said jaw-plate when said nut or nuts are loosened.

17. The combination with the stationary jaw-plate D provided at its top with the laterally-projecting lugs $d^8$ resting on the machine-frame, of the hopper H placed above said lugs and which, when bolted down, will serve to assist in holding the said jaw-plate in place.

18. In a crushing-machine, the combination with a movable jaw, having a convex face portion, and a second jaw with which the said movable jaw coöperates and which has a concave face portion, of a pitman jointed to the rear end of the frame of said movable jaw, a toggle or toggles connected with said movable jaw, and a rigid guide-link coöperating with said toggle or toggles to force said convex face of the movable jaw to roll or rock in a predetermined course.

19. In a crushing-machine, the combination with a movable jaw, having a curved face portion, and a second jaw with which said movable jaw coöperates, of a pitman jointed to the rear end of the frame of the said movable jaw, a toggle or toggles connected with said movable jaw and having their front centers in line with the lower axis of said pitman, and a rigid guide-link connected with said movable jaw and which coöperates with said toggle or toggles to force the curved face of said jaw to roll or rock in a predetermined course.

In testimony whereof we affix our signatures in presence of two witnesses.

THOMAS L. STURTEVANT.
  THOMAS J. STURTEVANT.

Witnesses:
 JOS. F. O'CONNELL,
 WM. H. ELLIS.